United States Patent [19]

Murakami et al.

[11] Patent Number: 5,030,017
[45] Date of Patent: Jul. 9, 1991

[54] ROLLING BEARING

[75] Inventors: Yasuo Murakami, Yamato; Nobuaki Mitamura, Kawasaki, both of Japan

[73] Assignee: Nippon Seiko Kabushiki Kaisha, Tokyo, Japan

[21] Appl. No.: 557,574

[22] Filed: Jul. 24, 1990

[30] Foreign Application Priority Data

Jul. 25, 1989 [JP] Japan .................................. 1-192258

[51] Int. Cl.⁵ ............................................. F16C 19/00
[52] U.S. Cl. ............................ 384/492; 384/49; 384/625; 384/912; 384/913
[58] Field of Search ............... 384/492, 912, 913, 625, 384/49, 565, 569, 548

[56] References Cited

U.S. PATENT DOCUMENTS 4,871,268 10/1989 Furumura et al. ................... 384/912
4,904,094 2/1990 Furumura et al. ................... 384/492
4,930,909 6/1990 Murakami et al. ................... 384/492

OTHER PUBLICATIONS

"Manual of Metal"—a Japanese publication—no translation (no date).

Primary Examiner—Lenard A. Footland
Attorney, Agent, or Firm—Basile and Hanlon

[57] ABSTRACT

A rolling bearing has races and a rolling element. At least one of the races and the rolling element is made of a carburized or carbonitrided alloy steel. The content of a fine carbide present in the surface layer of the one element of the rolling bearing is 20–50 vol %. The content of retained austenite in the surface layer is 10–25 vol %. The rolling bearing provides a long-life rolling bearing suitable for use in a transmission and engine.

18 Claims, 8 Drawing Sheets

DISSOLVED CARBON (C) CONTENT OR DISSOLVED
CARBON AND NITROGEN (C+N) CONTENT (wt%)

ROLLING BEARING

BACKGROUND OF THE INVENTION

1. Field of the Invention

The present invention relates to rolling bearings used, for example, with automotive vehicles, agricultural machinery, construction machinery and iron-and-steel machinery and, more particularly, to long-lived rolling bearings required for use in a transmission and engine.

2. Description of the Related Art

A rolling bearing is in a severe use under high bearing loads so as to experience a repeated shearing stress. In order to endure the shearing stress and secure rolling contact fatigue life (hereinafter also referred to as rolling life or fatigue life), the rolling bearing which is made of high-carbon chromium steel (e.g., JIS-SUJ 2), then quenched and tempered so as to have a 58-64 $H_RC$ surface hardness, has been used. On the other hand, a case hardened steel rolling bearing has been made of a low-carbon case hardened steel of a good hardenability, e.g., JIS-SCR420H, -SCM420H, -SAE6820H or -SAE4320H, since a hardness curve of the case hardened steel rolling bearing must be determined in accordance with an internal shearing stress distribution created by a contact bearing. Then, this case hardened steel rolling bearing has been carburized or carbonitrided, quenched and tempered and thus has secured a required life so that the inner and outer races of the case hardened steel rolling bearing have 58-64 $H_RC$ surface hardnesses and 30-48 $H_RC$ core hardness.

However, since it is desirable that a rolling bearing have an increased fatigue life at the present time, a more severe condition, e.g., foreign matter entrained in a bearing lubricating oil, can damage the rolling element and the inner and outer races of the rolling bearing. Thus, a prior-art bearing hardness has been occasionally insufficient.

Thus, it is necessary that the surface hardness of a rolling bearing be increased. There is a prior-art process for increasing the surface hardness of a rolling bearing in which the rolling bearing is made of, e.g., a precipitation hardened tool steel (e.g., JIS-SKH or -SKD) including added carbide forming elements and precipitating a multitude of carbides (see pages 780-797 of Metal Manual, 3rd edition, edited by Japanese Metal Institute).

The rolling bearing made of the above precipitation hardened tool steel has advantages in that it has an increased rolling contact surface hardness and resists the occurrence of an impression caused by a foreign matter entrained in lubricating oil. On the other hand, it has a drawback in that a coarsening of a precipitating carbide which may be caused by the content of an alloying element to produce the carbide creates stress concentration in a part surrounding the carbide and propagates from this part into a flaking thereby reducing the fatigue life of the rolling bearing.

Limiting the content of the retained austenite in the surface layer of a rolling bearing within a predetermined range can moderate stress concentration at the edge of an impression by the foreign matter to increase the fatigue life of the rolling bearing (see Japanese patent application SHO 62-209167). However, an automotive rolling bearing used under a high bearing load, for example, is required to have a greater increase in its fatigue life.

In order to overcome these outstanding problems, the present invention has an object to provide a longer-lived rolling bearing than prior-art rolling bearings.

SUMMARY OF THE INVENTION

In order to achieve the object, the present invention provides a rolling bearing including races and a rolling element, characterized in that at least one of the races and the rolling element is made of an alloy steel which is then carburized or carbonitrided, a content of fine carbide in the surface layer of said one of the races and rolling element is 20-50 vol % and the content of retained austenite in said surface layer is 10-25 vol %.

Herein, the surface layer of the present invention is defined as a 1-2 Zo deep layer of each of the races and the rolling element of the rolling bearing from a rolling contact surface of the element, when Zo represents a position (i.e., depth) of maximum shearing stress. The preferred embodiments of the present invention have, e.g., about 0.2-0.5 mm order thick surface layers. The depth of the surface layer is computed from a value of a bearing applied to the rolling contact surface of each of the races and the rolling element of the rolling bearing.

Corresponding alloy steels comprise steels essentially consisting of C: 0.3-0.6 wt %; Cr: 3-14 wt %; Ti: 40 ppm or less; O: 12 ppm or less; P: 200 ppm or less; S: 80 ppm or less; and the balance of Fe, of C: 0.3-0.6 wt %; Cr: 3-14 wt %; Ti: 40 ppm or less; Si: 0.9 wt % or less; Mo: 0.4-2.0 wt %; Mn 2.0 wt % or less; O: 12 ppm or less; P: 200 ppm or less; S: 80 ppm or less; and the balance of Fe, of C: 0.3-0.6 wt %; Cr: 3-14 wt %; Ti: 40 ppm or less; Si: 0.9 wt % or less; Mn: 2.0 wt % or less; V: 0.03-1 wt %; O: 12 ppm or less; P: 200 ppm or less; S: 80 ppm or less; and the balance of Fe, of C: 0.3-0.6 wt %; Cr: 3-14 wt %; Ti: 40 ppm or less; Si: 0.9 wt % or less; Mo: 0.4-2.0 wt %; Mn: 2.0 wt % or less; V: 0.03-1 wt %; O: 12 ppm or less; P: 200 ppm or less; S: 80 ppm or less; and the balance of Fe, of C: 0.3-0.6 wt %; Cr: 3-14 wt %; Si: 0.9 wt % or less; Mn: 2.0 wt % or less; Ti: 40 ppm or less; O: 12 ppm or less; P: 200 ppm or less; S: 80 ppm or less; and the balance of Fe.

The particle size of a fine carbide (defined as ½ of the total of the maximum diameter and minimum diameter of particle diameters of the fine carbide of the final alloy steel) of the final alloy steel is 0.5-1.0 μm. The surface hardness $H_RC$ of the final alloy steel is 65-70.

In accordance with the present invention, producing a sufficient content of fine carbides in the surface layer of at least one of the races and the rolling element of the rolling bearing to increase the surface hardness of said one element and prevents the occurrence of a microcrack possibly caused by foreign matter entrained lubricant. Thus, even when the rolling bearing of the present invention is used under clean lubrication, it enjoys a longer fatigue life than a conventional rolling bearing. On the other hand, when the rolling bearing of the present invention is used under foreign matter entrained lubrication, it enjoys a further longer fatigue life than the conventional rolling bearing. Thus, when the rolling bearing of the present invention is under both of these lubrication conditions, it enjoys a longer fatigue life under a high rolling load.

DESCRIPTION OF THE INVENTION

The present inventors studied from various viewpoints an increasing of fatigue life of a rolling bearing made of high-clean steel, which was a kind of alloy steel with a small content of an impurity. This resulted in discoveries in refining of carbides in the surface layer of the rolling bearing and the content of the carbides therein, a relationship between the content of retained austenite in the surface layer of the rolling bearing and the fatigue life of the rolling bearing, and a relationship between the content of S and a ratio of occurrence of a forging cracking. These discoveries underlie the present invention which is variously defined in the attached claims.

The operations of the included elements of the present invention and critical significances of the contents of the included elements will be described hereinafter.

C: 0.3-0.6 wt %

C was required to increase the hardness of an element of the rolling bearing which had been quenched and tempered.

Above 0.6 wt % content of C decreased the tenacity of the core of the rolling bearing element to decrease the rupture strength of the rolling bearing element. On the other hand, below 0.3 wt % content of C required a longer time for carburization or carbonitriding which lowered heat-treatment productivity. Thus, the content of C was limited within the captioned range. It was preferably 0.35-0.45 wt %.

Cr: 3-14 wt %

The rolling bearing of the present invention is designed to produce a hard carbide in the surface layer of the rolling bearing and thereby increase the surface hardness of the rolling bearing. Cr was required to produce the hard carbide and bonded with carbon to produce fine chromium carbide.

Below 3 wt % content of Cr insufficiently decreased the content of the chromium carbide required to achieve a required surface hardness (65-70 $H_RC$) of the rolling bearing element. On the other hand, above 14 wt % content of Cr produced a macrocarbide in a material for the rolling bearing element so as to cause stress concentration about the macrocarbide and thereby decrease the fatigue life of the rolling bearing. Thus, the content of Cr was limited within the captioned case. It was preferably 11.0-13.0 wt %.

Ti: 40 ppm or less

Ti appeared as a nonmetal compound in the form of TiN. Since the hardness of TiN is high and the plasticity thereof is low, TiN was a source of stress concentration to decrease the fatigue life of the rolling bearing. Thus, a content of Ti was decreased as much as possible and limited within captioned range.

Si: 0.9 wt % or less

In-steel Si was effective to solution reinforcement and an increase of tempering softening resistance. However, a significantly increased content of Si significantly increased a heat-treatment caused decarburization to decrease the surface hardness of the rolling bearing element. Thus, the content of Si was limited within the captioned range. Certain embodiments of the present invention included Se so as to achieve the solution reinforcement and the increasing of the tempering softening resistance.

Mo: 0.4-2.0 wt %

Mo was required to produce the carbides in the surface layer of the rolling bearing and was as effective to an improvement of the hardenability of the rolling bearing element as Cr.

In the captioned range of Cr, 0.4 wt % or more of Mo was significantly effective to a production of fine carbides, so that the lower limit of the content of Mo was 0.4 wt %. On the other hand, above 2.0 wt % content of Mo produced a macrocarbide in the material for the rolling bearing element so as to decrease the fatigue life of the rolling bearing, in the same manner as Cr. Thus, the upper limit of the content of Mo was 2.0 wt %. The content of Mo was preferably 1.5-2.0 wt %. Several embodiments of the present invention included Mo so as to produce molybdenum carbide and thereby enhanced the surface hardness of the rolling bearing element.

Mn: 2.0 wt % or less

In-steel Mn largely contributed to the improvement of the hardenability of the rolling bearing element and Mn is inexpensive. However, a greater content of Mn was likely to produce a large content of a nonmetal inclusion and increase the hardness of the rolling bearing element, but decrease the forgeability, machinability, etc., of the rolling bearing element. Thus, the upper limit of the content of Mn was 2.0 wt %. Several embodiments of the present invention included Mn so as to increase the hardenability of the rolling bearing element.

V: 0.03-1 wt %

V precipitated in grain boundaries to suppress a coarsening of crystal grains, refine the crystal grains and bonded with carbon of the alloy steel to produce fine carbide. Adding V increased the hardness of the surface layer of the rolling bearing element so as to increase the wear resistance of the rolling bearing element. The operation of the 0.03 wt % or more content of V was significant, so that the lower limit of the content of V was 0.03 wt %. On the other hand, above wt % of V precipitated vanadium carbide in grain boundaries so as to deteriorate the workability and various mechanical properties of the rolling bearing element.

Thus, the upper limit of the content of V was 1 wt %. The content of V was preferably 0.8-1 wt %. Several embodiments included V so as to enhance the surface hardness of the rolling bearing element.

O: 12 ppm or less

Since O produced an oxide system nonmetal inclusion (especially $Al_2O_3$) which decreased the rolling contact fatigue life of the rolling bearing, the content of O was required to be decreased as much as possible. Thus, the upper limit of the content of O was 12 ppm.

P: 200 ppm or less

Since P decreased the impact resistance of the alloy steel, the content of P was required to be decreased. Thus, the upper limit of the content of P was 200 ppm.

S: 80 ppm or less

S caused a sulfide system nonmetal inclusion, e.g., MnS. MnS had a low hardness and a high plasticity so as to cause a cracking during a preworking, e.g., rolling and forging, of the material for the rolling bearing element. The content of S was required to be decreased so that the cracking during preworking, e.g., forging, was prevented and a hard working of the material for the rolling bearing element could be conducted. Thus, the upper limit of the content of S was 80 ppm.

Figure 2:
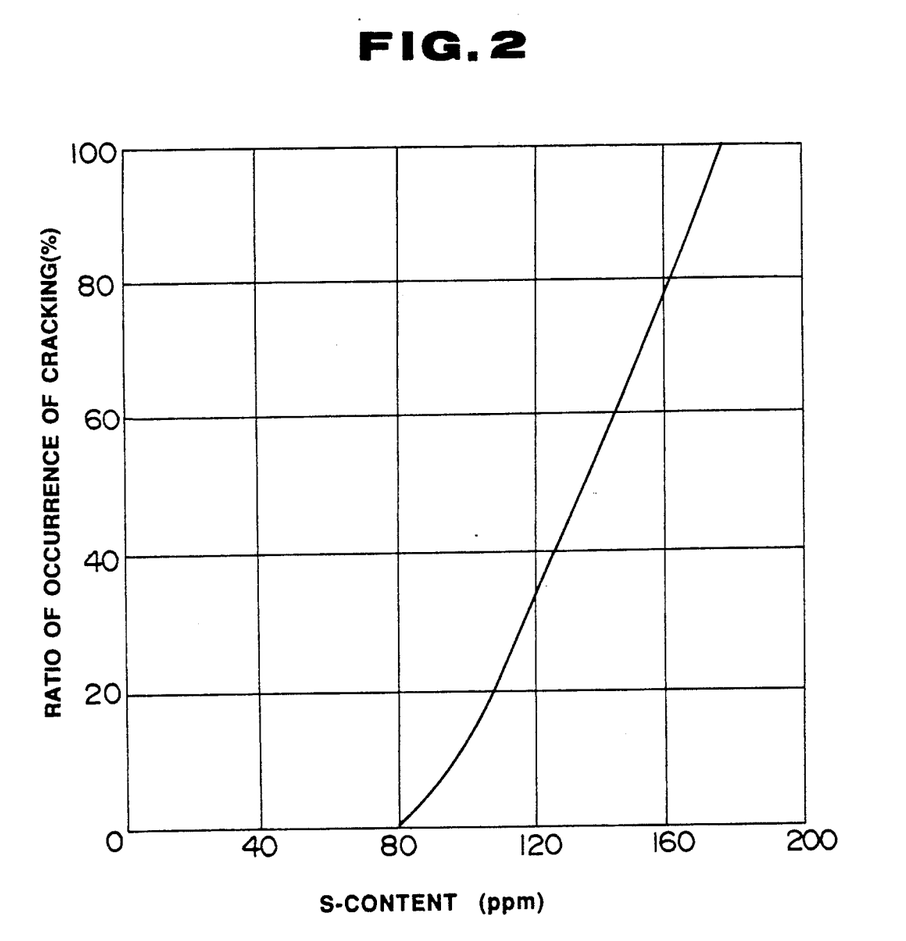
FIG. 2 is a characteristic graph representing a relationship between the content of S in an alloy steel and a ratio of occurrence of cracking.

Round cylindrical test pieces of 20-mm diameter × 30-mm length were made of alloy steels of the compositions described hereafter and cold-worked (i.e., cold forged) at 80% upsetting ratio. A ratio of occurrence of cracking in the test pieces was measured. FIG. 2 represents a relationship between the content of in-steel S and a ratio of occurrence of cracking. FIG. 2 indicates that the ratio of occurrence of cracking decreases as the in-steel S decreases. 80 ppm or less content of S causes the ratio of occurrence of cracking to be 0%. Thus, 80 ppm or less content of S allows a harder working of the material for the rolling bearing element.

The operation of retained austenite characterizing the present invention and the critical significance of the content of the retained austenite will be described hereinafter.

When a rolling bearing was used under foreign matter entrained lubrication, the surfaces of the inner and outer races and rolling element are repeatedly in contact with the foreign matter to experience occurrences of impression which has sharp edges.

Retained austenite is soft and has a hardness in the order of about 300 Hv, provided that this hardness depends on the content of C in the material for the rolling bearing element. Unlike low-carbon martensite of a low hardness, retained austenite is subject to a working induced transformation and is converted to martensite, i.e., hardened. Thus, a sufficient content of retained austenite present int he surface layer of the rolling bearing element receives a deformation energy applied to the surface of the rolling bearing element to convert it to martensite and concurrently be hardened one a relative passing frequency of a mating element (e.g., the races to the rolling element) passing past an impression in the rolling bearing element during rolling exceeds a predetermined number. This hardening process moderates a rolling load concentration at the edge of the impression created by the foreign matter entrained in the lubricating oil to prevent the occurrence of a microcrack, thereby increasing the fatigue life of the rolling bearing.

Figure 1:
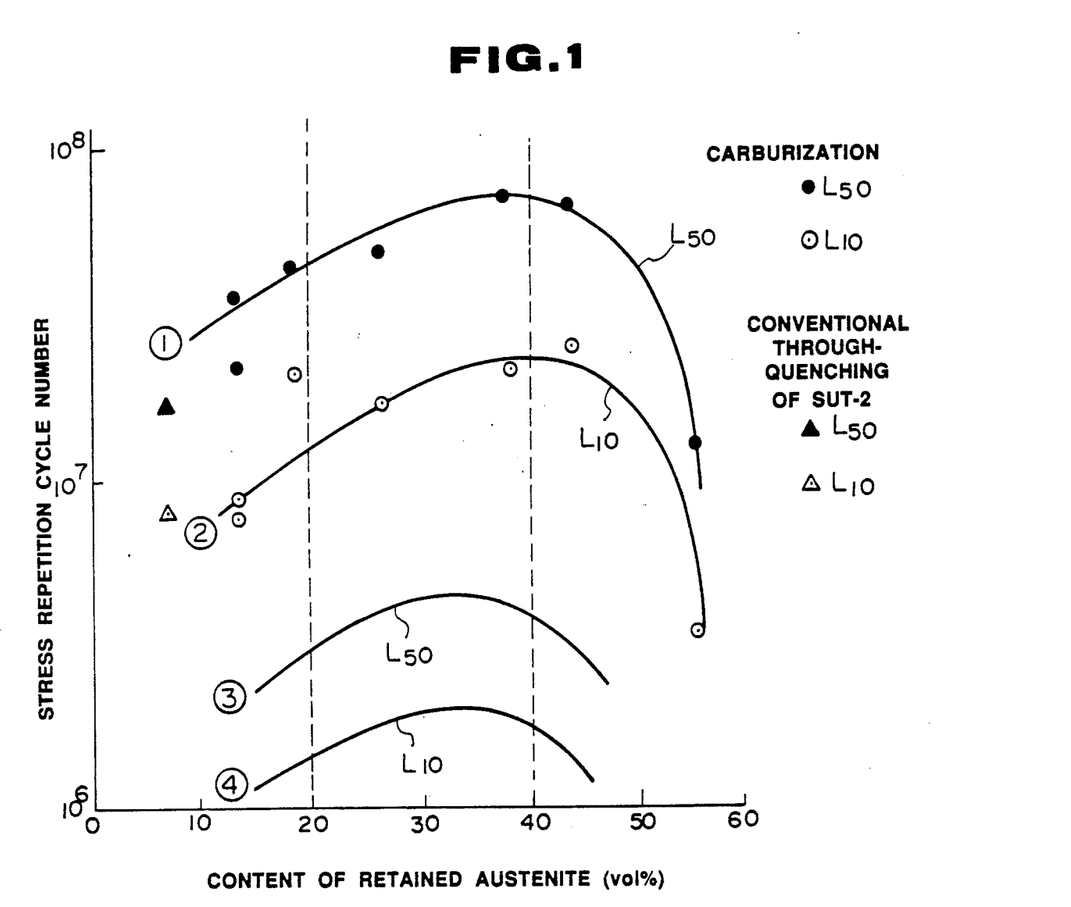
FIG. 1 is a characteristic graph representing a relationship between the fatigue life of a rolling bearing and the content $r_R$ (vol%) of retained austenite in the surface layer.

As is apparent from the FIG. 1 relationship between the fatigue life of the rolling bearing and the content $r_R$ (vol %) of the retained austenite in the surface layer, the fatigue life $L_{10}$ of a material for a rolling bearing in a foreign matter entrained lubrication test, which is represented by a stress repetition cycles number, depends on the content of the retained austenite in the surface layer.

That is, when the content of the retained austenite in the surface layer was 40% or less, the fatigue life of the material for a rolling bearing under foreign matter entrained lubrication was essentially increased as the content of the retained austenite in the surface layer was increased.

On the other hand, when the content of carbides in the surface layer of the rolling bearing element was selected to be 20-50 vol % in order to increase the hardness of a rolling surface of the rolling bearing element, the content of the retained austenite in the surface layer was caused to exceed 25 vol % so that the mechanical strength of the material for the rolling bearing element was impracticably decreased. In addition, since the material for the rolling bearing element included carbides-producing elements, e.g., Cr, Mo and V, a less amount of C entered the matrix of the material for the rolling bearing element so that it was difficult for the content of the retained austenite in the surface layer to exceed 25 vol %.

Since below 10 vol % content of the retained austenite in the surface layer less increased the fatigue life of the rolling bearing under foreign matter entrained lubrication, the content of the retained austenite in the surface layer was 10-25 vol %.

In FIG. 1, the curves 1 and 2 represent the fatigue lives $L_{10}$ and $L_{50}$ of rolling bearings under clean lubrication and the curves 3 and 4 represent the fatigue lives $L_{10}$ and $L_{50}$ of rolling bearings under foreign matter entrained lubrication.

Conditions of the FIG. 1 test were as follows:

The test used a testing machine described on pages 10-21 of "Special Steels Manual, 1st edition" edited by Electrosteelmaking Research Institute and published by Rikohgakusha on May 25, 1965 and a lubricant in which 300 ppm of steel powder of $Fe_3C$ of 66.3 $H_RC$ hardness and 80-160 μm particle size was added to a turbine oil, FBK oil RO68 produced by NIPPON OIL CO., LTD. and tested the fatigue lives of the rolling bearings under 500 kgf/mm² maximum bearing at 3,000 cpm stress repetition speed.

The operations of the carbides present in the surface layer of the rolling bearing and critical significances of the contents thereof will be described hereinafter.

In accordance with the present invention, the surface layer of at least one of the races and the rolling element included fine carbides produced by carburization or carbonitriding, quenching and tempering. These carbides are sufficiently hard to provide a good wear resistance and resulted in increasing the fatigue life of the rolling bearing. In addition, these carbides, which are fine, prevented stress concentration to be caused by a load imposed on the rolling bearing so as to increase the fatigue life of the rolling bearing.

Carbides of the present invention comprise, e.g., $Cr_7C_3$, $Cr_3C_6$, $Mo_2C$, VC, $V_4C_3$, $Fe_3C$ and double carbides thereof.

Sizes of the carbides of the present invention are preferably 0.5-1 μm.

The content of the carbides of the present invention present in the surface layer of a rolling bearing were 20-50 vol %. The critical significances of these values will be described hereinafter.

A desired surface hardness of the rolling bearing element is 65-70 $H_RC$ in order to increase the fatigue life of the rolling bearing. Below 20 vol % content of the carbides failed to provide the desired surface hardness. On the other hand, above 50 vol % content of the carbides impreferably causes fine carbides to cohere and thereby coarsen so that the cohering carbides cause stress concentration. Thus, the content of the carbides present in the surface layer of the rolling bearing element was 20-50 vol %. This provided a rolling bearing element of a surface hardness as high as 65-70 $H_RC$.

Figure 3:
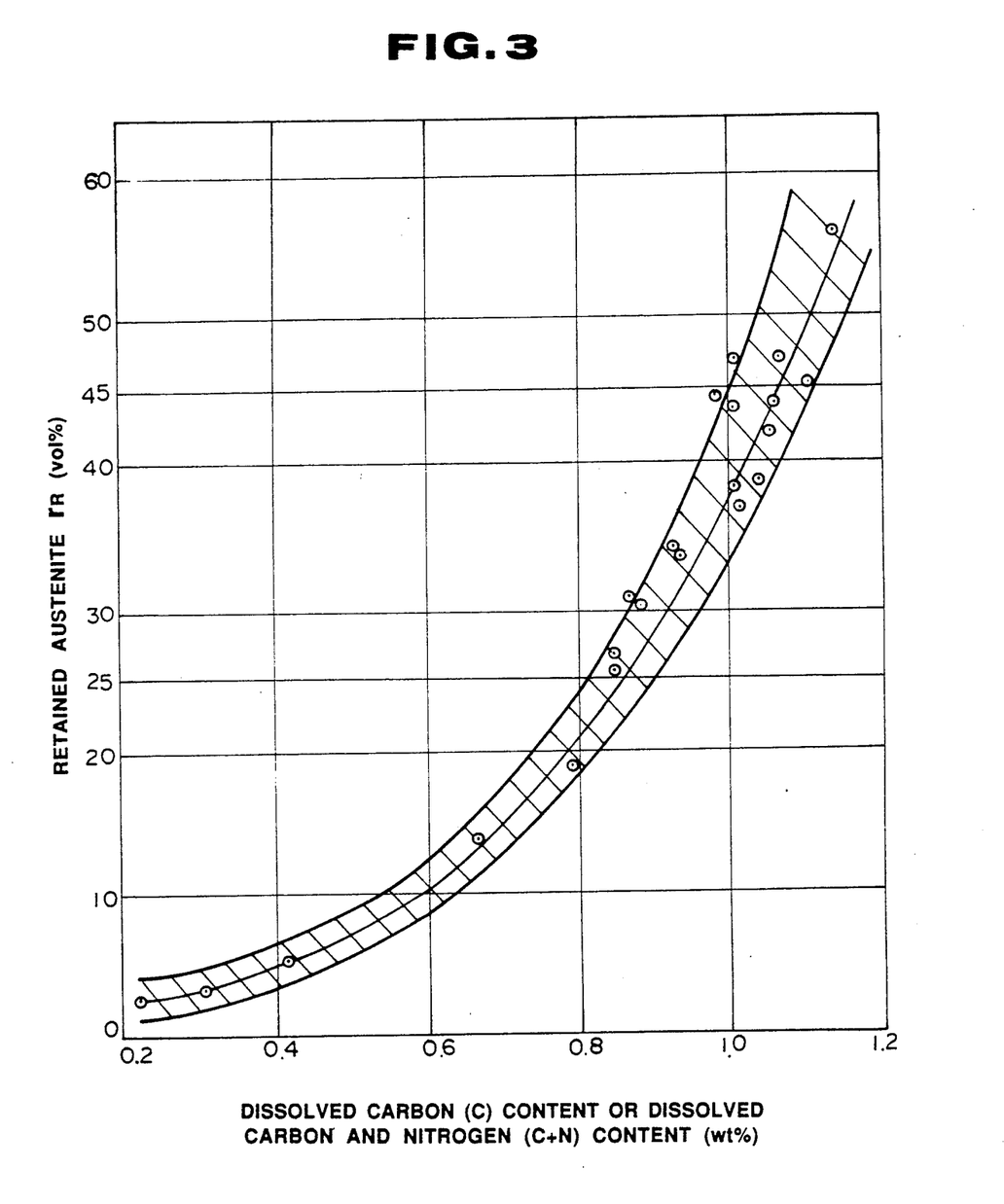
FIG. 3 is a characteristic graph representing a relationship between the content of dissolved carbon or dissolved carbon-and-nitrogen and the content of the retained austenite in the surface layer of the rolling bearing.

In accordance with the present invention, carburizing or carbonitriding alloy steels of the compositions defined hereafter provided 0.6-0.8 wt % content of dissolved carbon or carbon-and-nitrogen, as seen in FIG. 3, and 2.5-3.8 wt % total content of C present in the surface layer of the rolling bearing element. Quenching and tempering the resulting alloy steels provided 10-25 vol % content of the retained austenite present in the surface layer of the rolling bearing element.

In addition, the carburization and carbonitriding of each of the alloy steels can produce cores of carbides when the alloy steel is heated above $A_1$ transformation temperature and the subsequent quenching and tempering of the alloy steel can precipitate fine spherical carbides in the surface layer of the rolling bearing element. In addition, providing the 0.6-0.8 wt % content of dissolved carbon and concurrently the 2.5-3.8 wt % total content of C present in the surface layer of the rolling bearing element can provide 20-50 vol % content of the carbides present in the surface layer of the rolling bearing element.

DESCRIPTION OF THE PREFERRED EMBODIMENTS

The preferred embodiments of the present invention will be described hereinafter.

Sequentially carburizing, soaking, quenching and tempering the alloy steels of the present invention and the alloy steels of controls provided in the inventive test pieces Nos. 1-7 and the control test pieces Nos. 8-15. Table 1 shows the compositions and characteristics of the test pieces Nos. 1-15.

Figure 4:
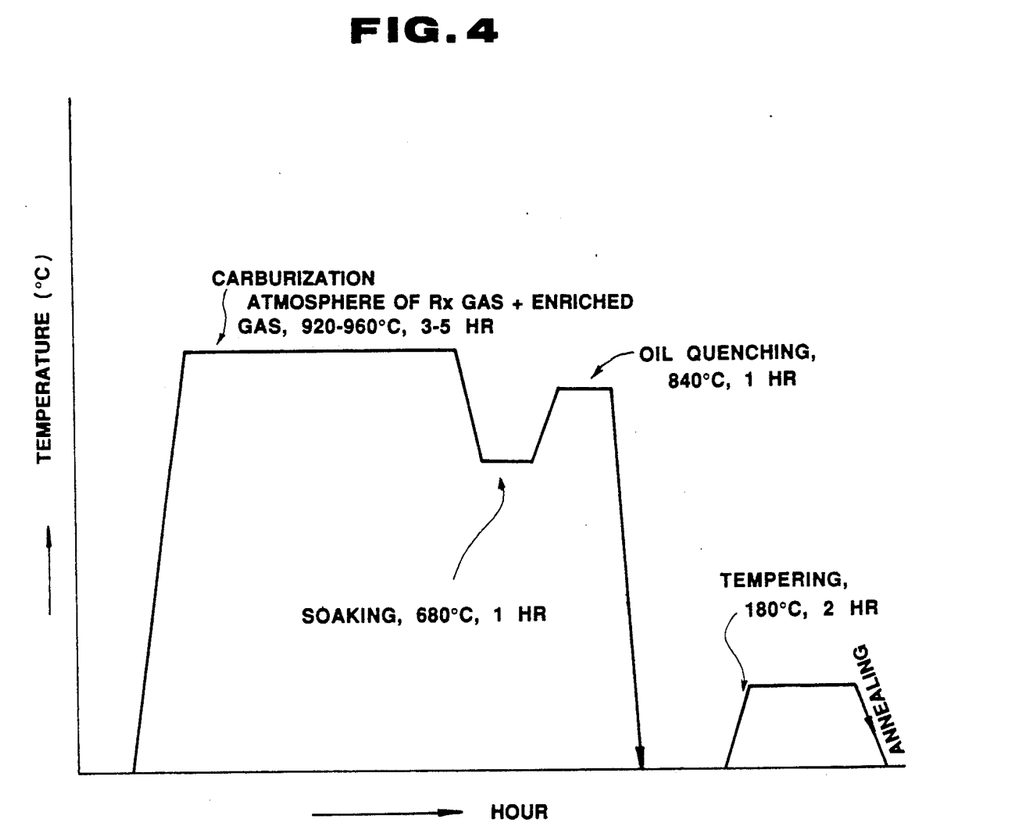
FIGS. 4 and 5 are graphs illustrating heat-treatment conditions in producing the rolling bearing of the present invention.

As shown in the graph of FIG. 4, a direct quenching of a carburization was conducted under the atmosphere of Rx gas+enriching gas at 920°-960° C. for about 3-5 hours, then a soaking of 680° C.×1 hour was conducted. Finally, an oil quenching of 840° C.×1 hour and then a tempering of 180° C.×2 hours was conducted.

Figure 5:
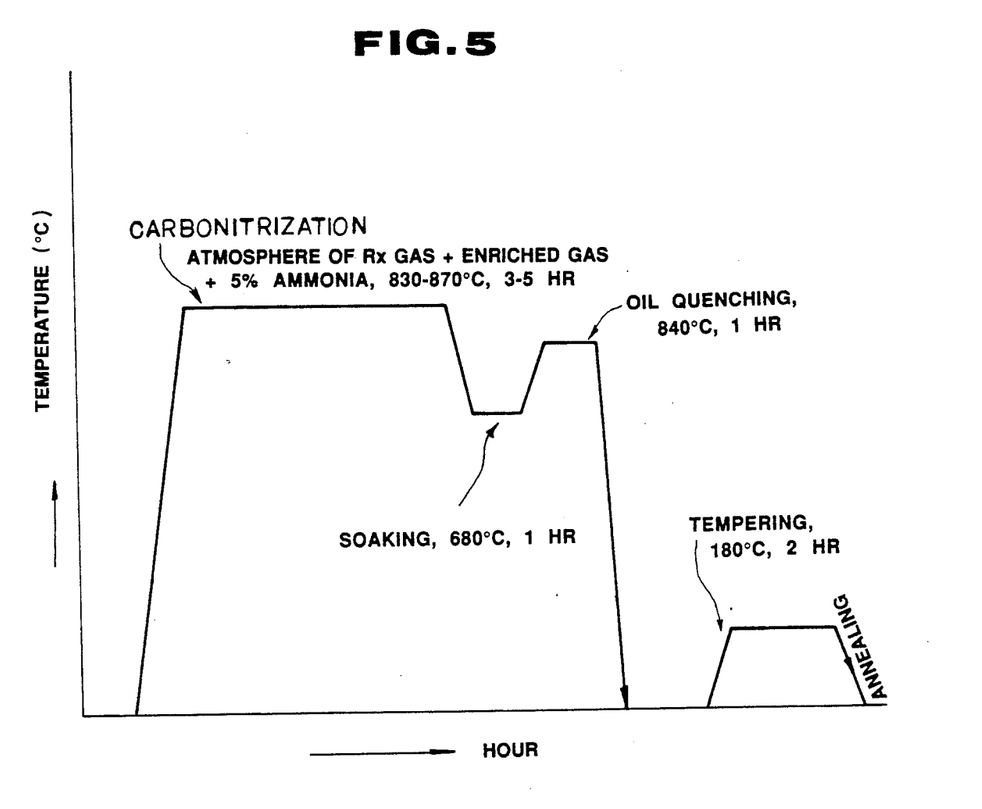

On the other hand, as shown in the graph of FIG. 5, a carbonitriding was conducted under the atmosphere of Rx gas+enriching gas+5% ammonia at 830°-870° C. for about 3-5 hours followed by the same steps as the steps subsequent to the direct quenching of the FIG. 4 graph carburization.

When the temperature of each of the test pieces Nos. 1-15 exceeded an A1-transformation temperature from the soaking step to the oil quenching of each of the FIGS. 4 and 5 processes, cores of carbides were produced and then fine spherical carbides with these cores precipitated in the surface layer of the test piece.

Then, the $H_RC$ surface hardness, the vol % content of the carbides present in the surfaces layer, the vol % content of the retained austenite present in the surface layer and the average particle size of the carbides were measured. Disc-shaped test pieces applicable to both the inner and outer races of the rolling bearing were made of the carburized test pieces Nos. 1-15. The fatigue life $L_{10}$ of each of the disc-shaped test pieces represented by stress repetition cycles number was measured. Table 1 shows the results of this test.

Figure 6:
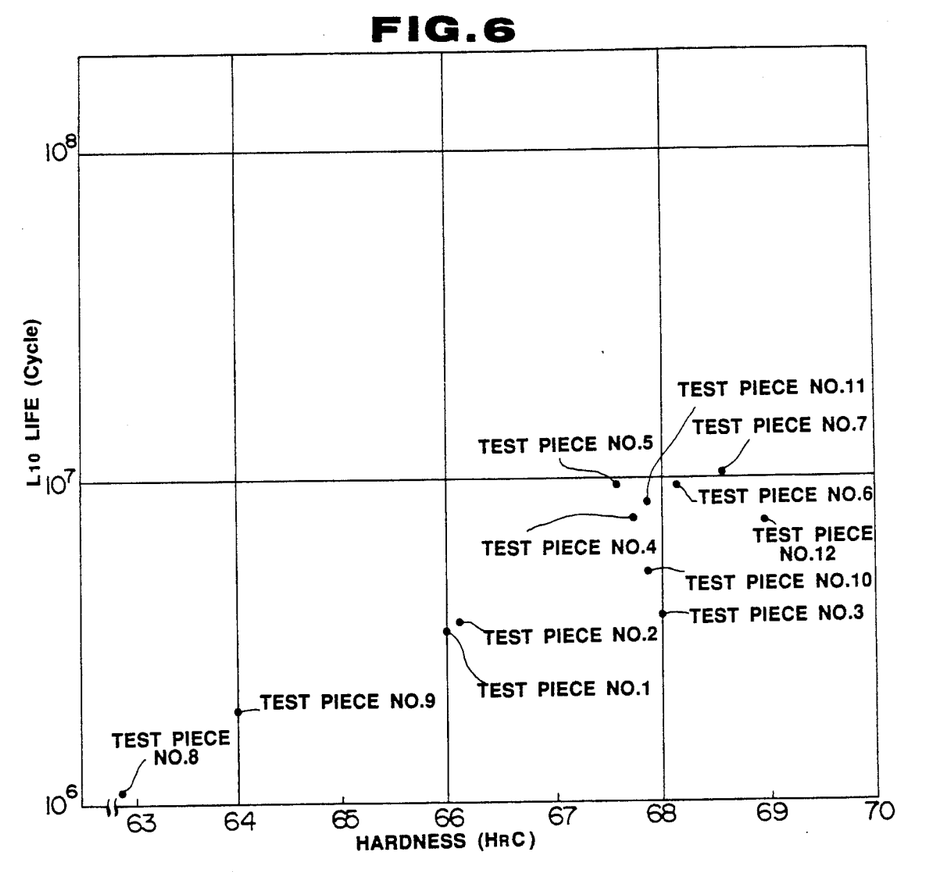
FIG. 6 is a characteristic graph representing a relationship between the surface hardness $H_RC$ of a test piece and a bearing fatigue life $L_{10}$ represented by a stress repetition cycle number.
Figure 7:
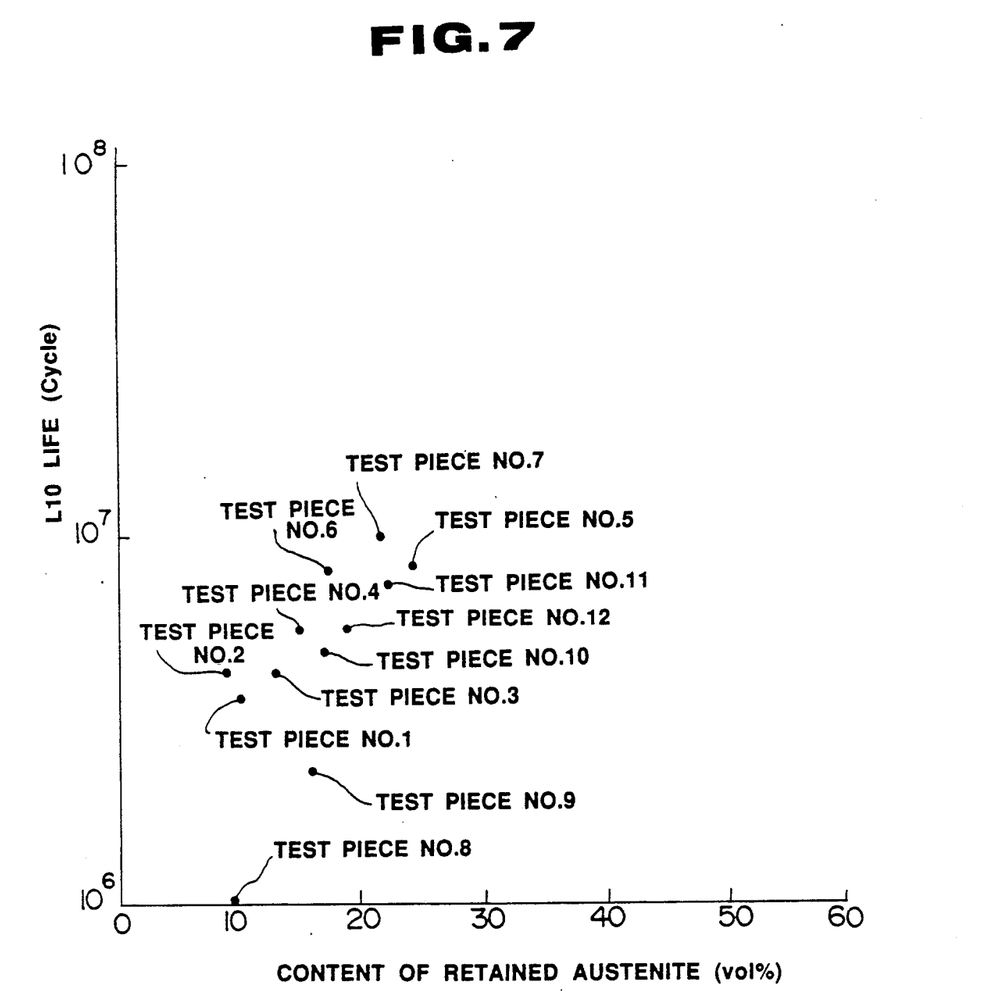
FIG. 7 is a characteristic graph representing a relationship between the content of retained austenite in the surface layer and the bearing fatigue life $L_{10}$.
Figure 8A:
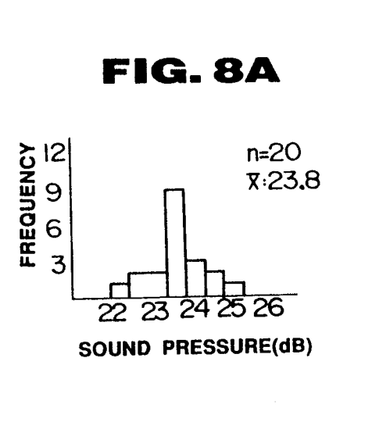
FIGS. 8A-8F are characteristic graphs representing acoustic characteristics of test pieces.
Figure 8B:
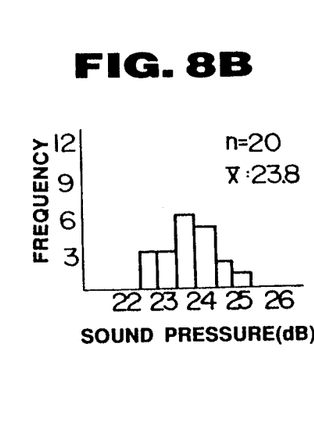
Figure 8C:
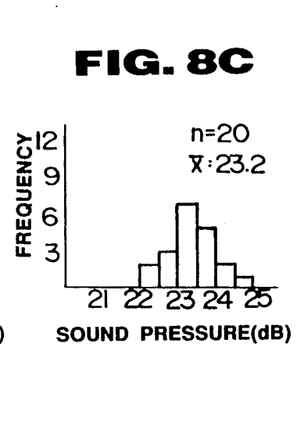
Figure 8D:
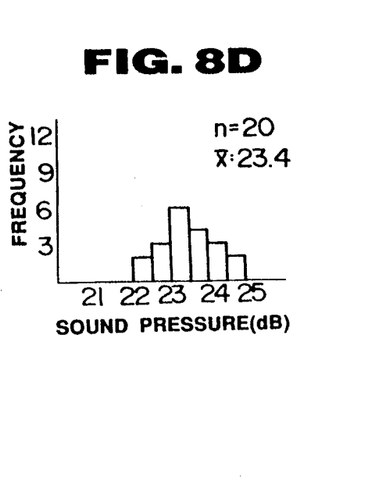
Figure 8E:
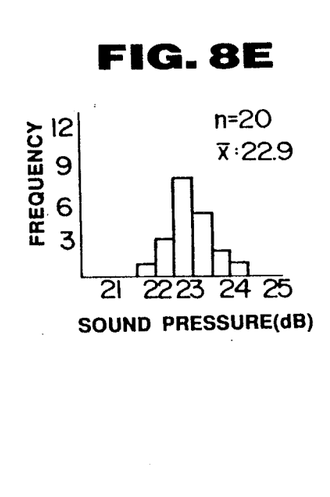
Figure 8F:
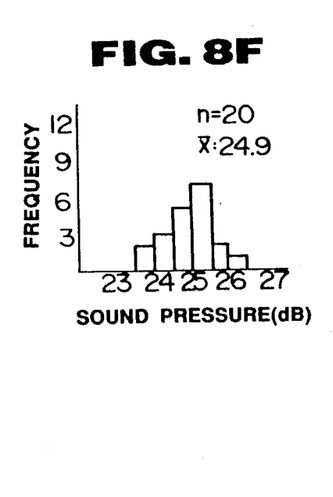

FIG. 6 represents the relationships between hardnesses and fatigue lives. FIG. 7 represents the relationships between the contents of the retained austenite in the surface layer and the rolling lives of the rolling bearings.

The rolling lives of the rolling bearings were measured under the following conditions:

A rolling bearing life test used the thrust testing machine described on pages 10-21 of "Special Steels Manual, 1st edition" edited by Electrosteelmaking Research Institute and published by Rikohgakusha on May 25, 1965. A lubricant in which 330 ppm of steel powder of $Fe_3C$ of 66.3 $H_RC$ hardness and 80-160 μm particle size was added to the turbine oil, FBK oil RO68, produced by NIPPON OIL CO., LTD. and the fatigue lives of the rolling bearings were tested under 500 kgf/mm² maximum bearing at 3,000 cpm stress repetition speed.

The expiration of the fatigue life of a rolling bearing was defined as a moment at which the surface of the rolling bearing element experienced a flaking.

TABLE 1

| Test piece No. | C | Si | Mn | Cr | Mo | V | O | Ti | S | P | $H_RC$ surface hardness | In-surface layer carbides content vol % | $r_R$ vol % | $L_{10}$ rolling fatigue life × 10⁶ cylcles |
|---|---|---|---|---|---|---|---|---|---|---|---|---|---|---|
| 1 | 0.42 | 0.08 | 0.18 | 7.0 | — | — | 9 | 40 | 60 | 130 | 66.0 | 22 | 12 | 5 |
| 2 | 0.42 | 0.25 | 0.7 | 6.8 | — | — | 9 | 40 | 60 | 140 | 66.1 | 23 | 10 | 6 |
| 3 | 0.43 | 0.25 | 0.72 | 12.9 | — | — | 11 | 40 | 40 | 130 | 68.0 | 35 | 14 | 6 |
| 4 | 0.42 | 0.26 | 0.70 | 6.7 | 1.1 | — | 8 | 40 | 60 | 130 | 67.7 | 29 | 17 | 8 |
| 5 | 0.42 | 0.25 | 0.69 | 6.6 | — | 0.83 | 8 | 40 | 50 | 130 | 67.6 | 28 | 25 | 9.5 |
| 6 | 0.42 | 0.26 | 0.70 | 6.8 | 1.1 | 0.84 | 10 | 40 | 60 | 130 | 68.2 | 33 | 18 | 9.5 |
| 7 | 0.43 | 0.25 | 0.7 | 10.7 | 1.2 | 0.83 | 10 | 40 | 60 | 130 | 68.7 | 38 | 23 | 10 |
| 8 | 1.02 | 0.28 | 0.36 | 1.47 | — | — | 11 | 40 | 60 | 150 | 62.9 | 8 | 10 | 1.0 |
| 9 | 0.43 | 0.26 | 0.70 | 2.1 | — | — | 10 | 40 | 60 | 130 | 64 | 11 | 17 | 3.5 |
| 10 | 0.42 | 0.25 | 0.70 | 6.5 | 2.6 | — | 9 | 40 | 50 | 130 | 67.8 | 30 | 18 | 7.0 |
| 11 | 0.42 | 0.26 | 0.71 | 6.6 | — | 1.6 | 9 | 40 | 60 | 130 | 67.8 | 30 | 24 | 9.0 |
| 12 | 0.42 | 0.25 | 0.71 | 6.7 | 2.4 | 1.5 | 10 | 40 | 60 | 130 | 68.9 | 39 | 20 | 8.0 |
| 13 | 0.42 | 0.25 | 0.7 | 14.4 | 4.2 | 1.6 | 9 | 40 | 50 | 140 | 68.3 | 54 | 23 | 1.8 |
| 14 | 0.42 | 0.25 | 0.69 | 7.0 | 1.0 | 0.8 | 8 | 40 | 60 | 130 | 66.0 | 24 | 30 | 2.0 |
| 15 | 0.41 | 0.25 | 0.70 | 7.6 | — | — | 9 | 40 | 60 | 130 | 64.4 | 21 | 5 | 1.7 |

Contents of O, Ti, S and P are represented in ppm and those of the other elements in wt %.

Conditions of heat treatments of the present embodiment will be described hereinafter.

As is apparent from Table 1, since the test piece No. 1 has an in-surface layer carbides concentration or content as good as 22 vol % and thereby a surface hardness as good as 66 $H_RC$ and the content of the retained austenite in the surface layer is within an inventive range, the test piece No. 1 can achieve a good rolling life even under foreign matter entrained lubrication. Si and Mn present in the test piece No. 1 are inevitable impurities at the present time. However, even if the contents of Si and Mn present in a test piece would be decreased as much as possible so as to be zero, this test piece could have an equal surface hardness and an equal rolling life essentially the same as those of the test piece No. 1.

Since an in-surface layer carbides content, the content of the retained austenite in the surface layer and the contents of the elements of each of the test pieces Nos. 2–7 also are within the ranges of the present invention, this test piece can achieve essentially an equal surface hardness and essentially an equal rolling life.

The test piece No. 8 provides a control made of JIS-SUJ-1 in which control the content of C exceeds the inventive range and the content of Cr is below the inventive range. A low content of Cr of the test piece No. 8 decreased the content of in-surface layer chromium carbide to be 8 vol % so that a 62 $H_RC$ surface hardness was insufficiently provided. Thus, the fatigue life $L_{10}$ of a rolling bearing corresponding to the test piece No. 8 was as short as $1 \times 10^6$ cycles. In addition, since the content of C of the test piece No. 8 was great, the tenacity of the matrix thereof was decreased so that the rupture strength thereof was also decreased.

The test piece No. 9 provides a control in which the content of C is below an inventive range. The content of insurface layer chromium carbide was decreased to 11 vol % as that of the test piece No. 8 so that an about 64 $H_RC$ surface hardness was insufficiently provided. Thus, the fatigue life $L_{10}$ of a rolling bearing corresponding to the test piece No. 9 was as short as $3.5 \times 106$ cycles.

The test piece No. 10 provides a control in which the content of Mo exceeds the inventive range. The content of Mo of the test piece No. 10 failed to produce a significant difference in producing fine molybdenum carbide in a rolling surface of a rolling bearing, so that the rolling bearing corresponding to the test piece No. 10 was costly and carbides coarsening in the test piece No. 10 decreased the fatigue life of the rolling bearing more than that of a rolling bearing corresponding to the test piece No. 4.

The test piece No. 11 provides a control in which the content of V exceeds the inventive range. The content of V of the test piece No. 11 failed to produce a significant difference in refining crystal grains, so that a rolling bearing corresponding to the test piece No. 11 was costly and the workability and various mechanical properties of the rolling bearing corresponding to the test piece No. 11 were deteriorated.

The test piece No. 12 provides a control in which the contents of Mo and V exceed the inventive ranges. The contents of Mo and V of the test piece No. 12 failed to produce a significant difference in producing fine carbides in the surface layer of a rolling bearing. In addition, the content of the test piece No. 12 failed to produce a significant difference in refining crystal grains. Thus, a rolling bearing corresponding to the test piece No. 12 was costly. Carbides of the teat piece No. 12 are likely to coarsen so that the fatigue life of a rolling bearing corresponding to the test piece No. 12 was undesirably decreased.

The test piece No. 13 provides a control in which the content of carbides exceeds the inventive range. The test piece No. 14 provides a control in which the content of the retained austenite in the surface layer exceeds the inventive range. The total content of carbides and the total content of retained austenite of each of the test piece Nos. 13 and 14 were substantially increased so that the content of martensite supporting the matrix of that test piece was undesirably decreased to decrease the mechanical strength and the fatigue life of the rolling bearing corresponding to the test pieces Nos. 13 and 14.

The test piece No. 15 provides a control in which the content of the retained austenite in the surface layer is below the inventive range so that the fatigue life of a rolling bearing corresponding to the test piece No. 15 was decreased under foreign matter entrained lubrication.

10 cylindrical test pieces of 20-mm diameter $\times$ 30-mm length were made of each of the test pieces Nos. 1–7 and cold-worked (i.e., cold forged) at an 80% upsetting ratio. A ration or occurrence of cracking in each of the test pieces Nos. 1–7 was 0%.

6-mm bored small ball bearings (686) were made of the test pieces Nos. 1, 2, 4–6 and 8. A wear resistance test of each of these small ball bearings was conducted. Conditions of the test were as follows:

Preload: 2 kgf, Oscillating angle: 8, Speed: 20 Hz, Under grease lubrication, Evaluation cycles: $2 \times 10^7$, Temperature: room temperature, and Number of manufactured rolling bearings for each of the test pieces: 8.

Tables 2 and 3 show results of the wear resistance test.

TABLE 2

| | Presence or absence of fretting | |
|---|---|---|
| Test piece No. | Fretting present | Fretting absent |
| 1 | 2 | 6 |
| 2 | 3 | 5 |
| 4 | 1 | 7 |
| 5 | 1 | 7 |
| 6 | 1 | 7 |
| 8 | 5 | 3 |

The values in the fretting-present column represent the number of ball bearings experiencing a fretting. The values in the fretting-absent column represent the number of ball bearings experiencing no fretting.

TABLE 3

| | Amount of wear caused by fretting | |
|---|---|---|
| Test piece No. | Outer race groove | Inner race groove |
| 1 | 0–0.2 | 0–0.3 |
| 2 | 0–0.3 | 0–0.3 |
| 4 | 0–0.1 | 0–0.1 |
| 5 | 0–0.1 | 0–0.1 |
| 6 | 0–0.1 | 0–0.1 |
| 8 | 0–0.3 | 0–0.3 |

The values in the columns of outer and inner race grooves represent depths ($\mu$m) of wear from the rolling surface of each groove.

Tables 2 and 3 show the following: The number and amounts of wear of rolling bearings corresponding to each of the test pieces Nos. 1 and 2, the in-surface layer carbides contents of which are 22 vol % and 23 vol % both within the inventive range and experiencing a fretting, are smaller than those of rolling bearings corresponding to the test piece No. 8, the in-surface layer carbides content of which is 8 vol % below the inventive range and experiencing a fretting.

The number and amounts of wear of rolling bearings corresponding to each of the test pieces Nos. 4–6, the in-surface layer carbides contents of which are higher than those of the test pieces Nos. 1 and 2 and experienced a fretting, are smaller than those of the test pieces Nos. 1 and 2.

A validation test on 20 of the 6-mm bored small ball bearings (696) validating that they have a good impression resistance and thereby have an acoustic property was conducted in accordance with JIS-B 1548 so that a 2-$C_0$ rated statistic load created impressions. FIGS. 8A–8F represent the results of the validation test.

As is apparent from FIGS. 8A–8F, which respectively represent test pieces number 1–6 FIG. 8, average sound pressures (Db) of the test pieces Nos. 1, 2 and 4–6 are lower than that of the test piece No. 8. This indicates that since the in-surface layer carbide content and the rolling surface hardnesses of the test pieces Nos. 1, 2 and 4–6 are higher than those of the test pieces Nos. 1 and 2 have a further lower sound pressure than the test piece No. 8.

Table 1 depicts the results of the test of the rolling lives of the disc-shaped test pieces applicable to both the inner and outer races of a rolling bearing. A rolling life test of rolling elements made of the same material as the disc-shaped test pieces had the same results as those of Table 1.

The above wear resistance test and acoustic characteristic test were conducted on the overall rolling bearing, i.e., all of the inner and outer races and the rolling element, made of the test pieces Nos. 1–15. However, when at least one of the inner and outer races and the rolling element was made of an alloy steel of the present invention, a rolling bearing with said one element had essentially the same good wear resistance and acoustic characteristic.

What is claimed is:

1. A rolling bearing, comprising:
   races;
   a rolling element; and
   wherein at lest one of said races and said rolling element is made of an alloy steel which is then carburized or carbonitrided, the content of fine carbide present in the surface layer of at least one of said races and said rolling element of the rolling bearing is 20–50 vol %, and the content of retained austenite in said surface layer is 10–25 vol %.

2. The rolling bearing as recited in claim 1, wherein the particle size of a fine carbide (defined as ½ of the total of the maximum diameter and minimum diameter of particle diameters of the fine carbide of said surface layer) is 0.5–1.0 μm.

3. The rolling bearings as recited in claim 1, wherein the surface hardness $H_RC$ of said surface layer of at least one of said races and said rolling element is 65–70.

4. A rolling bearing comprising:
   races;
   a rolling element; and
   wherein at least one of said races and said rolling element is made of an alloy steel essentially consisting of C: 0.3–0.6 wt %, Cr: 3–14 wt %, Ti: 40 ppm or less, O: 12 ppm or less, P: 200 ppm or less, S: 80 ppm or less and the balance of Fe, the alloy steel being carburized or carbonitrided, the content of fine carbide present in the surface layer of at least one of said races and said rolling element of the rolling bearing is 20–50 vol %, and the content of retained austenite in said surface layer is 10–25 vol %.

5. The rolling bearing as recited in claim 4, wherein the particle size of a fine carbide (defined as ½ of the total of the maximum diameter and minimum diameter of particle diameters of the fine carbide of said surface layer) is 0.5–1.0 μm.

6. The rolling bearing as recited in claim 4, wherein the surface hardness $H_RC$ of said surface layer of at lest one of said races and said rolling element is 65–70.

7. A rolling bearing comprising:
   races;
   a rolling element; and
   wherein at least one of said races and said rolling element is made of an alloy steel essentially consisting of C: 0.3–0.6 wt %, Cr: 3–14 wt %, Ti: 40 ppm or less, Si: 0.9 wt % of less, Mo: 0.4–2.0 wt %, Mn: 2.0 wt % or less, O: 12 ppm or less, P: 200 ppm or less, S: 80 ppm or less and the balance of Fe, the alloy steel being carburized or carbonitrided, the content of fine carbide present in the surface layer of at least one of said races and said rolling element of the rolling bearing is 20–50 vol %, and the content of retained austenite in said surface layer is 10–25 vol %.

8. The rolling bearing as recited in claim 7, wherein the particle size of a fine carbide (defined as ½ of the total of the maximum diameter and minimum diameter of particle diameters of the fine carbide of said surface layer) is 0.5–1.0 μm.

9. The rolling bearing as recited in claim 7 wherein the surface hardness $H_RC$ of said surface layer of at least one of said races and said rolling element is 65–70.

10. A rolling bearing comprising:
    races;
    a rolling element; and
    wherein at least one of said races and said rolling element is made of an alloy steel essentially consisting of C: 0.3–0.6 wt %, Cr: 3–14 wt %, Ti: 40 ppm or less, Si: 0.9 wt % or less, Mn: 2.0 wt % or less, V: 0.03–1 wt %, O: 12 ppm or less, P: 200 ppm or less, S: 80 ppm or less and the balance of Fe, the alloy steel being carburized or carbonitrided, the content of fine carbide present in the surface layer of at least one of said races and said rolling element of the rolling bearing is 20–50 vol %, and the content of retained austenite in said surface layer is 10–25 vol %.

11. The rolling bearing as recited in claim 4 wherein the particle size of a fine carbide (defined as ½ of the total of the maximum diameter and minimum diameter of particle diameters of the fine carbide of said surface layer) is 0.5–1.0 μm.

12. The rolling bearing as recited in claim 10 wherein the surface hardness $H_RC$ of said surface layer of at least one of said races and said rolling element is 65–70.

13. A rolling bearing comprising:
    races;
    a rolling element; and
    wherein at least one of said races and said rolling element is made of an alloy steel essentially consisting of C: 0.3–0.6 wt %, Cr: 3–14 wt %, Ti: 40 ppm or less, Si: 0.9 wt % or less, Mo: 0.4–2.0 wt %, Mn:

2.0 wt % or less, V: 0.03-1 wt %, O: 12 ppm or less, P: 200 ppm or less, S: 80 ppm or less and the balance of Fe, the alloy steel being carburized or carbonitrided, the content of fine carbide present in the surface layer of at least one of said races and said rolling element of the rolling bearing is 20-50 vol %, and the content of retained austenite in said surface layer is 10-25 vol %.

14. The rolling bearing as recited in claim 13, wherein the particle size of a fine carbide (defined as ½ of the total of the maximum diameter and minimum diameter of particle diameters of the fine carbide of said surface layer) is 0.5-1.0 μm.

15. The rolling bearing as recited in claim 13 wherein the surface hardness $H_RC$ of said surface layer of at least one of said races and said rolling element is 65-70.

16. A rolling bearing comprising:
races;
a rolling element; and
wherein at lest one of said races and said rolling element is made of an alloy steel essentially consisting of C: 0.3-0.6 wt %, Cr: 3-14 wt %, Si: 0.9 wt % or less, Mn: 2.0 wt % or less, Ti: 40 ppm or less, O: b 12 ppm or less, P: 200 ppm or less, S: 80 ppm or less and the balance of Fe, the alloy steel being carburized or carbonitrided, the content of fine carbide present in the surface layer of at least one of said races and said rolling element of the rolling bearing is 20-50 vol %, and the content of retained austenite in said surface layer is 10-25 vol %.

17. The rolling bearing as recited in claim 16 wherein the particle size of a fine carbide (defined as ½ of the total of the maximum diameter and minimum diameter of particle diameters of the fine carbide of said surface layer) is 0.5-1.0 μm.

18. The rolling bearing as recited in claim 16 wherein the surface hardness $H_RC$ of said surface layer of at least one of said races and said rolling element is 65-70.

* * * * *

UNITED STATES PATENT AND TRADEMARK OFFICE
CERTIFICATE OF CORRECTION

PATENT NO. : 5,030,017

DATED : July 9, 1991

INVENTOR(S) : Yasuo Murakami and Nobuaki Mitamura

It is certified that error appears in the above-identified patent and that said Letters Patent is hereby corrected as shown below:

In the Claims:

Column 11, line 67, after "Fe,", please insert -- said at least one of said races and said rolling element which has been made of--.

Column 11, line 45, please delete "lest" and insert --least--.

Column 12, line 23, after "Fe,", please insert --said at least one of said races and said rolling element which has been made of--.

Column 12, line 46, after "Fe,", please insert --said at least one of said races and said rolling element which has been made of--.

Column 12, line 53, please delete "4" ans insert --10--.

Column 13, line 3, after "Fe,", please insert -- said at least one of said races and said rolling element which has been made of--.

UNITED STATES PATENT AND TRADEMARK OFFICE
CERTIFICATE OF CORRECTION

PATENT NO. : 5,030,017

DATED : July 9, 1991

INVENTOR(S) : Yasuo Murakami and Nobuaki Mitamura

It is certified that error appears in the above-identified patent and that said Letters Patent is hereby corrected as shown below:

Column 14, lines 4-5, delete O:b 12" and insert --O:12 --.

lines 6, after "Fe,", insert --said at least one of said races               and said rolling element which has been made of --.

Signed and Sealed this

Sixteenth Day of November, 1993

*Attest:*

BRUCE LEHMAN

*Attesting Officer*      *Commissioner of Patents and Trademarks*